(12) United States Patent
Fletcher et al.

(10) Patent No.: US 7,305,832 B2
(45) Date of Patent: Dec. 11, 2007

(54) WORK EXTRACTION ARRANGEMENT

(75) Inventors: Paul Fletcher, Rugby (GB); James I Oswald, Hinckley (GB)

(73) Assignee: Rolls-Royce plc, London (GB)

( * ) Notice: Subject to any disclaimer, the term of this patent is extended or adjusted under 35 U.S.C. 154(b) by 319 days.

(21) Appl. No.: 11/008,659

(22) Filed: Dec. 10, 2004

(65) Prior Publication Data

US 2005/0126176 A1  Jun. 16, 2005

(30) Foreign Application Priority Data

Dec. 13, 2003  (GB) ................................. 0328950.1

(51) Int. Cl.
*F02C 7/10* (2006.01)
*F02C 7/143* (2006.01)
*F02C 6/16* (2006.01)

(52) U.S. Cl. ............................. 60/772; 60/726; 60/727; 60/728; 60/39.511

(58) Field of Classification Search ................. 60/727, 60/728, 257, 260, 659, 726
See application file for complete search history.

(56) References Cited

U.S. PATENT DOCUMENTS 4,079,591 A * 3/1978 Derby et al. ................. 60/659
4,329,842 A * 5/1982 Hoskinson .................... 60/727
4,437,312 A   3/1984 Newton
5,778,675 A * 7/1998 Nakhamkin .................. 60/659
6,260,349 B1 * 7/2001 Griffiths ....................... 60/727
2001/0004830 A1 * 6/2001 Wakana et al. .............. 60/727

FOREIGN PATENT DOCUMENTS

JP    11-343865    * 12/1999
JP    2001-095934  * 4/2001

* cited by examiner

*Primary Examiner*—Ted Kim
(74) *Attorney, Agent, or Firm*—W. Warren Taltavull; Manelli Denison & Selter PLLC

(57) ABSTRACT

A work extraction arrangement (10) comprises a cooling assembly (12) for cooling a gas to provide a working fluid capable of doing work. The arrangement (10) further includes storage means (14) for storing the working fluid and a turbine assembly (18) for extracting work from the working fluid. A fluid delivery assembly (16) is also provided to deliver the working fluid to the turbine assembly (18).

20 Claims, 3 Drawing Sheets

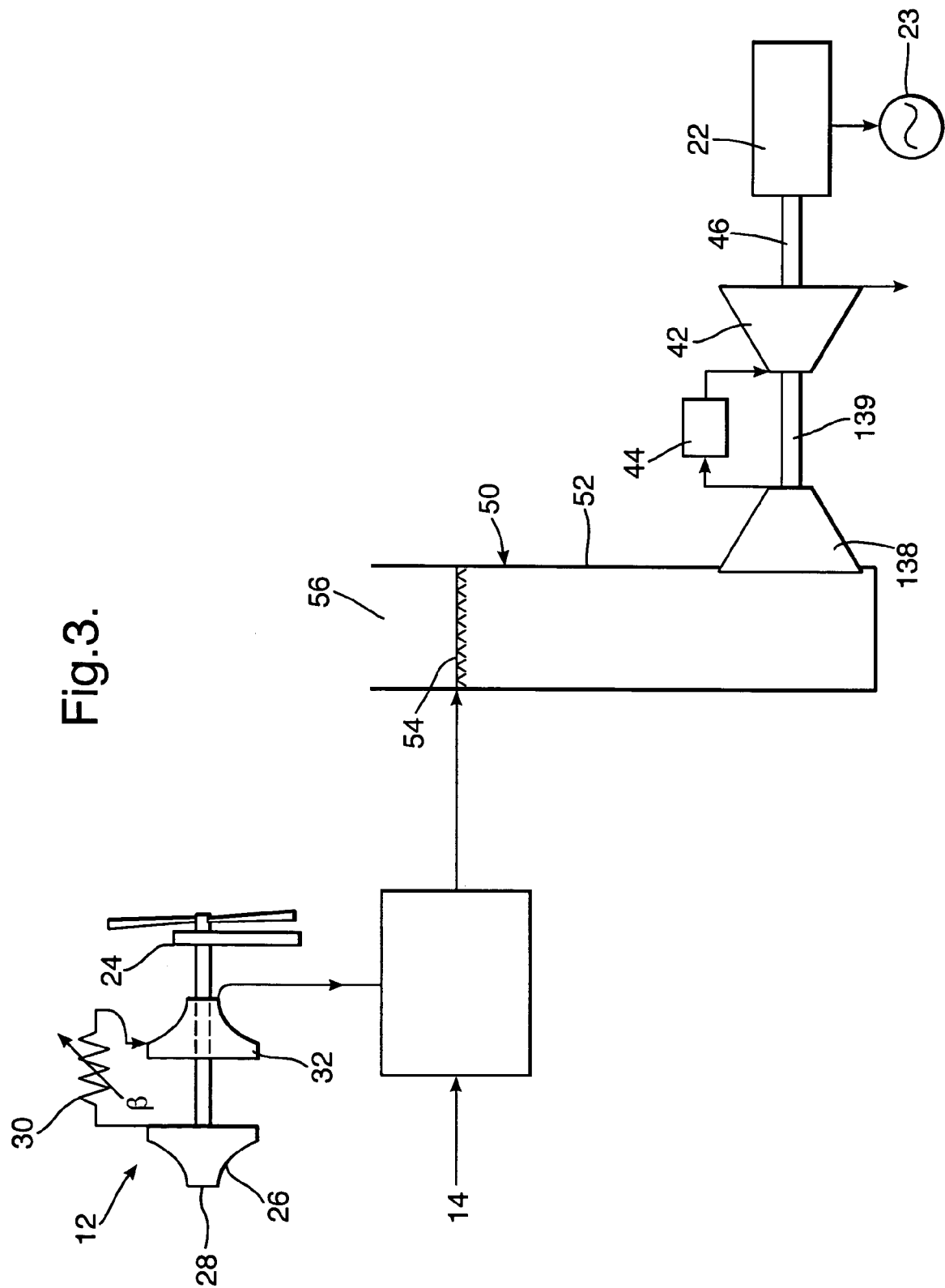

WORK EXTRACTION ARRANGEMENT

FIELD OF THE INVENTION

This invention relates to work extraction arrangements. More particularly, but not exclusively, the invention relates to electricity generating apparatus using liquefied air.

BACKGROUND OF THE INVENTION

The generation of electricity by burning fuel in a gas turbine engine requires the fuel to be piped to the engine. The fuel occurs in offshore fields and sometimes these fields are located at distances which make the extraction of the fuel unattractive. These fields are known as "stranded fields". A recent approach is to locate the gas turbine engine at the stranded fields to burn the fuel and generate electricity. Electric cables are provided to carry the electricity to the grid/users. Additionally wind turbines have been located at the stranded fields and use the same electric cable. The turbines are easily switched on/off to match the load demand on the grid. However, the wind turbines may only provide power when the wind blows.

According to one aspect of this invention, there is provided a work extraction arrangement comprising a cooling assembly for cooling a gas to provide a working fluid capable of doing work, storage means for storing the working fluid, a turbine assembly for extracting work from the working fluid, and a fluid delivery assembly for delivering the working fluid to the turbine assembly.

According to another aspect of this invention there is provided a method of extracting work from a gas, comprising cooling the gas to provide a working fluid capable of doing work, storing the working fluid, delivering the working fluid to a turbine assembly whereby work can be extracted from the working fluid by the turbine assembly.

SUMMARY OF THE INVENTION

Preferably, the fluid delivery assembly comprises a pumping means. In one embodiment, the fluid delivery assembly may comprise a pump, which may be suitable for pumping a liquefied gas. The pump may be suitable for pumping a mixture of gas and liquefied gas. Alternatively, the pump may be suitable for pumping a wholly liquefied gas. In another embodiment, the fluid delivery assembly comprises a main compressor, whereby when the fluid delivered to the main compressor is in the form of a gas, the main compressor can compress the gas. The fluid delivered to the main compressor may be in the form of a mixture of a gas and liquefied gas. The main compressor may be a compressor of a gas turbine engine.

The turbine assembly may comprise at least one main turbine for extracting work from the working fluid, and may include a combustor for combusting the working fluid when the working fluid comprises a combustible gas. Preferably, the combustor is arranged upstream of the turbine assembly.

Preferably, the main turbine is operable by the combustion products of the working fluid.

The work extraction arrangement may comprise an electricity generator, which may be driven by the turbine assembly. In one embodiment, the turbine assembly may be a turbine assembly of a gas turbine engine.

The cooling assembly may comprise a cooling cycle compressor for compressing the gas for cooling purposes. The cooling assembly may comprise a heat extractor for extracting heat from the compressed gas. The heat extractor may comprise a heat exchanger to exchange heat with the surroundings, e.g. the sea or the atmosphere.

The cooling assembly may comprise a cooling cycle turbine to extract preliminary work from the compressed gas thereby cooling the gas to provide said working fluid.

The working assembly may be driven by a wind turbine or other renewable energy source. Alternatively, the cooling assembly may be driven by electricity at night time, which is less expensive than electricity produced during daylight hours.

The working fluid provided by the cooling assembly may be in liquid or gaseous form.

In one embodiment, the work extraction arrangement may comprise a heater for heating the working fluid downstream of the fluid delivery assembly. The working fluid heater may comprise a heat exchanger. Preferably, the heat exchanger is arranged to exchange heat with the surroundings, for example, the sea or the atmosphere.

The work extraction arrangement may further comprise a recuperating heat exchanger, whereby exhaust gases from the main turbine can exchange heat with gas to be delivered to the combustor.

Embodiments of the invention will now be described by way of example only, with reference to the accompanying drawings in which:

BRIEF DESCRIPTION OF THE DRAWINGS

FIG. 3 is a schematic diagram of a third embodiment of a work extraction arrangement.

DETAILED DESCRIPTION OF THE INVENTION

Figure 1:
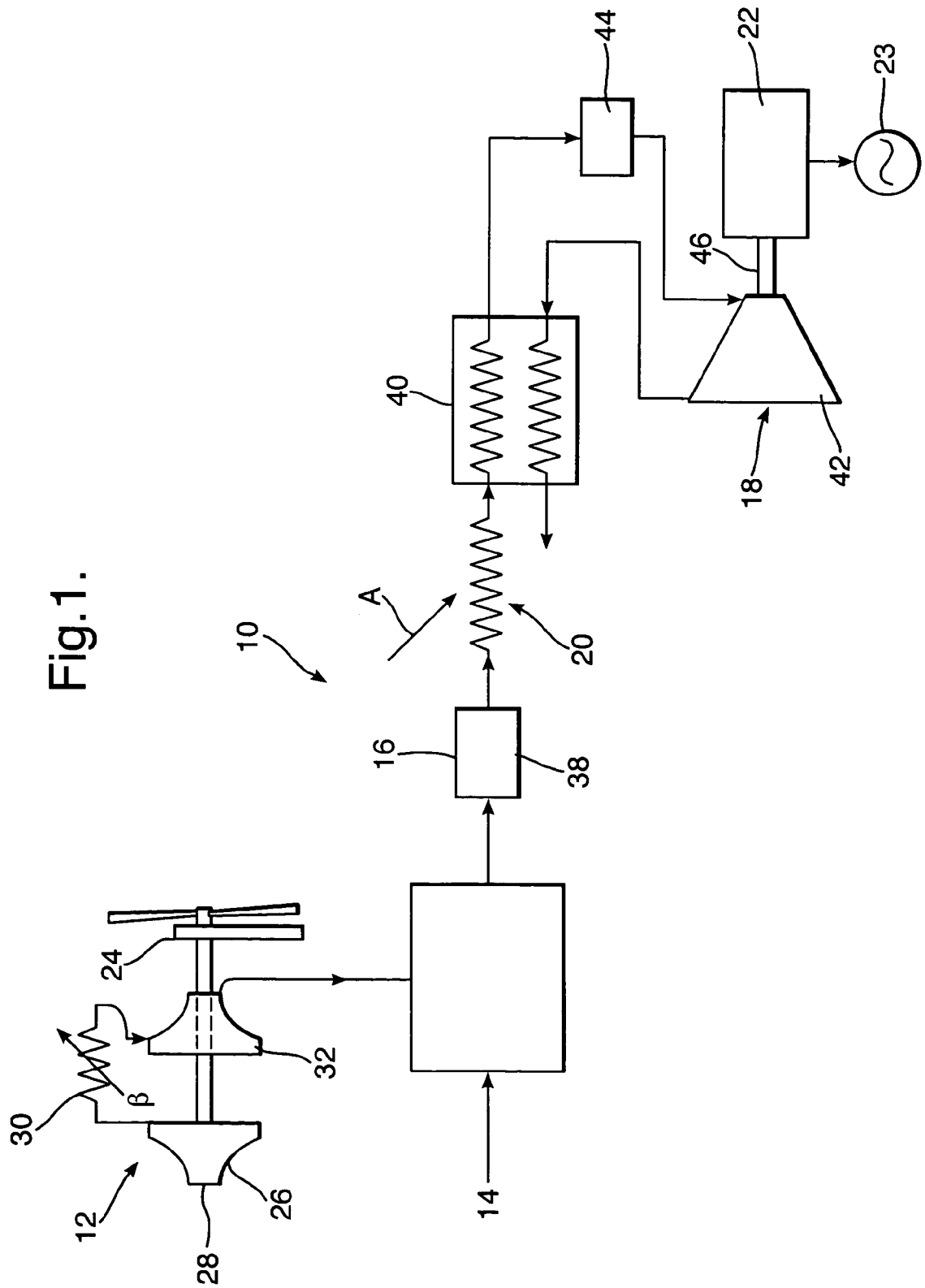
FIG. 1 shows a schematic diagram of a first embodiment of a work extraction arrangement

Referring to FIG. 1, there is shown a work extraction arrangement 10 comprising a cooling assembly 12 for cooling and liquefying a gas, for example, air, to produce a working fluid, such as liquefied air. The arrangement also includes storage means 14 for storing the liquefied air, a fluid delivery assembly 16 for delivering the liquefied air to a turbine assembly 18 to extract work from the working fluid.

A heat exchanger 20 is provided downstream of the fluid delivery assembly 16 to extract heat from the atmosphere and heat the liquefied air, as represented by the arrow A. In the heat exchanger 20, the liquefied air is heated to provide gaseous air.

Downstream of the turbine assembly 18 there is provided an alternator 22 for generating electrical power 23. The alternator 22 is driven by the turbine assembly 18, as explained below.

The cooling assembly 12 comprises a wind turbine 24 which drives a compressor 26 having an air inlet 28. In another embodiment, the compressor 26 could be driven by an electric motor, which is powered by cheaper electricity during the night. Air compressed by the compressor 28 passes through a heat exchanger 30 where heat is extracted and transferred to the surroundings, for example the sea or the atmosphere, as represented by the arrow B. The cooler air is passed to a cooling turbine 32 which allows the compressed air to expand. As the compressed air expands through the cooling turbine 32, work and heat are extracted therefrom to liquefy the air. The liquid air is passed to the storage means 14, which may be in the form of suitable storage tanks for storing liquid air at about 80K.

When it is desired to generate electricity, for example, during peak hours, the air is supplied from the storage means 14 to the delivery assembly 16. In the embodiment shown in FIG. 1, the delivery assembly comprises a pump 38. The air passes from the pump 38 through the heat exchanger 20, in this embodiment, the air is in a liquid or at least a partially liquid state when it passes through the pump 38.

The air is heated in the heat exchanger 20 by extracting heat from the surroundings, for example, the sea or the atmosphere. The air is then passed through a recuperating heat exchanger 40 whereby heat is exchanged with exhaust gasses from the turbine assembly 18 to further heat the air. During these heating stages, the air is converted substantially wholly to a gas.

The turbine assembly 18 comprises a main turbine 42, and a combustor 44. The gas from the recuperating heat exchanger 40 is passed into the combustor 44 where it is combusted and the gaseous combustion products expand through the main turbine 42 causing it to rotate. The main turbine 42 is drivingly connected by the shaft 46 to the alternator 22 to drive the alternator 22 and generate the electrical power 23. Gases from the main turbine 42 are exhausted via the recuperating heat exchanger 40 to heat the incoming air.

Figure 2:
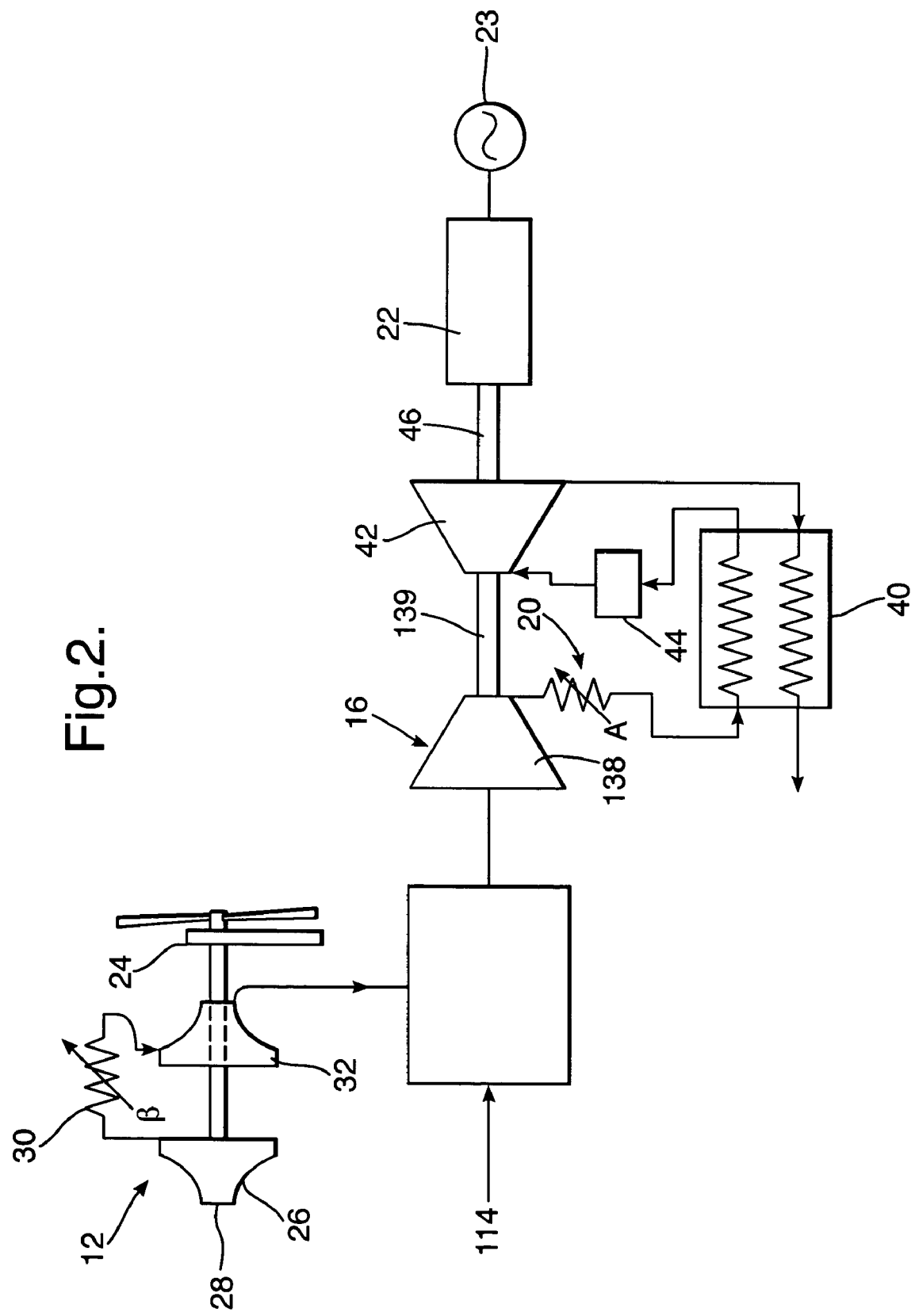
FIG. 2 is a schematic diagram of a second embodiment of a work extraction arrangement.

FIG. 2 shows a further embodiment, which comprises a modification to the embodiment shown in FIG. 1. The embodiment shown in FIG. 2 comprises many of the same features as shown in FIG. 1, and these have been designated within the same reference numerals. In FIG. 2, the storage means 14 is replaced by storage means 114, which is constructed to store the air in only partially liquefied form or wholly in the form of a gas. Also, the pump 38 is replaced by a main compressor 138 which is drivingly connected by a shaft 139 to the main turbine 42.

Air from the storage means 14 may be only partially liquefied or wholly in the form of a gas. The air passes to the main compressor 138 to be compressed. For example, if the inlet temperature of the main compressor 138, it is compressed. For example, if the inlet temperature of the main compressor 138 is 80K, and the compression ratio of the main compressor 138 is 15:1, the compressed air leaves the main compressor 138 at about 173K.

The compressed air passes from the compressor 138 through the heat exchanger 20 to extract heat from the surroundings, and then through the recuperating heat exchanger 40 to extract heat from the exhaust gases of the main turbine 42.

The air then passes through the combustor 44 to be combusted and expands through the main turbine 42 to drive the main turbine 42 which, in turn, drives the main compressor 138 via the shaft 139. The main turbine 42 also drives the alternator 22 via the shaft 46.

FIG. 3 shows a modification, which comprises many of the features shown in FIG. 1, and these have been designated with the same reference numerals.

The embodiment shown in FIG. 3 differs from the embodiment shown in FIG. 1 downstream of the storage means 14.

In FIG. 3, liquid air from the storage means 14 is mixed with ambient air from the atmosphere in a mixing assembly 50. The mixing assembly 50 comprises a conduit 52 having an inlet 56 for atmospheric air to enter the conduit 52. A spray means 54 is provided to spray liquid air from the storage means 14 into the conduit 52. As a result, the liquid air at 80K is mixed with incoming atmospheric air, which is likely to be at approximately 288K. The temperature of the air entering the main compressor 138 is cooled below the temperature of atmospheric air.

The main compressor 138 is connected to the main turbine 42 by the shaft 139 and air exiting from the main compressor 138 is combusted through the combustor 44 to drive the turbine 42 which in turn drives the main compressor 138. In addition, the turbine 42 is also connected by the shaft 46 to the alternator 22 to generate electricity 23.

There is thus described an advantageous apparatus for providing air to drive a turbine for use in the production of electricity at a generator 22.

Various modifications can be made without departing from the scope of the invention, for example, the air as stored in the storage means 14 could be cool gaseous air, rather than liquid air.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A work extraction arrangement comprising an electricity generator, a cooling assembly for cooling a gas to provide a working fluid capable of doing work, storage means for storing the working fluid, a turbine assembly comprising at least one main turbine for extracting work from the working fluid and a combustor for combusting said working fluid, a recuperating heat exchanger for exchanging heat from the exhaust of said main turbine with said working fluid to be delivered to said combustor and said turbine assembly, and a fluid delivery assembly for delivering the working fluid to the turbine assembly wherein said fluid delivery assembly comprises a main compressor.

2. A work extraction arrangement according to claim 1 wherein the fluid delivered to the main compressor is in the form of a gas, the main compressor compresses the gas.

3. A work extraction arrangement according to claim 1 wherein the combustor is arranged upstream of the main turbine assembly and the main turbine assembly is operable by the combustion products of the working fluid.

4. A work extraction arrangement according to claim 1 wherein the turbine assembly comprises a turbine assembly of a gas turbine engine.

5. A work extraction arrangement according to claim 1 wherein the cooling assembly comprises a cooling cycle compressor for compressing the gas for cooling purposes.

6. A work extraction arrangement according to claim 5 wherein the cooling assembly comprises a heat extractor for extracting heat from the compressed gas.

7. A work extraction arrangement according to claim 6 wherein the heat extractor comprises a heat exchanger to exchange heat with the surroundings.

8. A work extraction arrangement according to claim 1 wherein the cooling assembly comprises a cooling cycle turbine to extract work from the compressed gas thereby cooling the gas to provide said working fluid.

9. A work extraction arrangement according to claim 8 wherein the cooling cycle turbine is driven by a wind turbine.

10. A work extraction arrangement according to claim 1 wherein the working fluid provided by the cooling assembly is in liquid or gaseous form.

11. A work extraction arrangement according to claim 1 wherein the work extraction arrangement comprises a heater for heating the working fluid downstream of the fluid delivery assembly.

12. A work extraction arrangement according to claim 11 wherein the working fluid heater comprises a heat exchanger, and is arranged to exchange heat with the surroundings.

13. A method of extracting work from a gas, comprising cooling the gas to provide a working fluid capable of doing work, storing the working fluid, delivering the working fluid to a turbine assembly comprising a combustor combusting said working fluid and a main turbine wherein said working fluid is compressed during its delivery to said turbine assembly, a recuperating heat exchanger is provided for exchanging heat from the exhaust of said main turbine with said working fluid to be delivered to said combustor and said turbine assembly, whereby work can be extracted from the working fluid by the turbine assembly wherein the extraction of work from the working fluid involves driving an electricity generator to generate electricity.

14. A method according to claim 13 wherein the turbine assembly comprises a combustor and the working fluid is combusted upstream of the main turbine and the main turbine is operable by the combustion products of the working fluid.

15. A method according to claim 13 wherein the step of cooling the gas comprises compressing the gas for cooling purposes, extracting heat from the compressed gas and thereafter extracting preliminary work from the compressed gas thereby cooling the gas to provide said working fluid.

16. A method according to claim 15 wherein the step of extracting preliminary work from the compressed gas comprises driving a cooling cycle turbine with said compressed gas.

17. A method according to claim 13 wherein the cooling cycle turbine is driven by a wind turbine.

18. A method according to claim 13 wherein the working fluid is heated during its delivery to the turbine assembly.

19. A method according to claim 18 wherein the step of heating the working fluid comprises exchanging heat with the surroundings.

20. A work extraction arrangement comprising a cooling assembly for cooling a gas to provide a working fluid capable of doing work, the cooling assembly comprising a compressor, a heat exchanger and a turbine driven by a wind turbine, the work extraction arrangement further comprising storage means for storing said working fluid, a turbine assembly for extracting work from said working fluid, and a fluid delivery assembly for delivering said working fluid to said turbine assembly, said fluid delivery assembly comprising a compressor, a heat exchanger, a recuperator for exchanging heat with the exhaust of said turbine with said working fluid, and a combustor.

* * * * *